United States Patent
Lumsden

(10) Patent No.: US 7,613,289 B2
(45) Date of Patent: *Nov. 3, 2009

(54) APPLICATION BASED QUEUING VIA AN H.323/SIP INTERFACE

(75) Inventor: John E. Lumsden, Toronto (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 791 days.

This patent is subject to a terminal disclaimer.

(21) Appl. No.: 10/856,733

(22) Filed: May 28, 2004

(65) Prior Publication Data

US 2005/0018700 A1 Jan. 27, 2005

Related U.S. Application Data

(63) Continuation of application No. 09/735,500, filed on Dec. 14, 2000, now Pat. No. 6,763,093.

(51) Int. Cl.
*H04M 3/06* (2006.01)

(52) U.S. Cl. .............. 379/265.02; 370/412; 379/88.17; 379/88.22; 379/265.1; 379/266.01; 379/309; 455/462; 709/228; 718/104

(58) Field of Classification Search .............. 379/88.22, 379/88.23, 265.02, 266.01, 88.17, 265.1, 379/309; 370/412, 356, 522, 341; 709/202, 709/228; 455/462; 718/104
See application file for complete search history.

(56) References Cited

U.S. PATENT DOCUMENTS

| | | | |
|---|---|---|---|
| 5,020,095 A | 5/1991 | Morganstein et al. | |
| 5,133,004 A | 7/1992 | Heileman, Jr. et al. | |
| 5,652,789 A | 7/1997 | Miner et al. | |
| 5,881,135 A | 3/1999 | Watts et al. | |
| 5,884,032 A | 3/1999 | Bateman et al. | |
| 6,002,760 A * | 12/1999 | Gisby | 379/266.01 |
| 6,046,762 A | 4/2000 | Sonesh et al. | |
| 6,047,005 A * | 4/2000 | Sherman et al. | 370/522 |
| 6,208,657 B1 * | 3/2001 | Dendi et al. | 370/401 |
| 6,327,364 B1 * | 12/2001 | Shaffer et al. | 379/265.02 |
| 6,363,411 B1 * | 3/2002 | Dugan et al. | 709/202 |
| 6,377,570 B1 | 4/2002 | Vaziri et al. | |

(Continued)

OTHER PUBLICATIONS

"Nortel Networks' New CallPilot Provides Enterprise Customers With the Next Generation of Multimedia Messaging". Nortel Networks Press Release, Nov. 5, 1998:http//www.nortelnetworks.com/corporate/news/newsreleases/1998c/11_5_9898475_Call_Pilot.html.

(Continued)

*Primary Examiner*—Gerald Gauthier

(57) ABSTRACT

The present invention provides a telephony-accessed application system for providing a service, such as voicemail, in accordance with a switching interface such as in the ITU-T H.323 or IETF SIP recommendation. Queuing functionality is made possible in a system which employs a switch which does not support queuing. The queuing functionality is made possible by a queue means which is provided within an application means, i.e. the voicemail means itself. Consequently, the switch itself is relieved of the burden of having to keep track of the exact status of each of its ports at all times. The high-level queuing is performed at a logical level rather than at the physical level, and therefore affords a cleaner interface. Furthermore, the implementation of the queuing functions in the terminating application means allows for the use of a wider variety of intermediate switch means in a network.

18 Claims, 2 Drawing Sheets

U.S. PATENT DOCUMENTS

| | | | |
|---|---|---|---|
| 6,377,944 B1 | 4/2002 | Busey et al. | |
| 6,381,329 B1 | 4/2002 | Uppaluru et al. | |
| 6,430,282 B1 | 8/2002 | Bannister et al. | |
| 6,553,113 B1* | 4/2003 | Dhir et al. | 379/265.02 |
| 6,563,920 B1* | 5/2003 | Flockhart et al. | 379/265.1 |
| 6,563,921 B1 | 5/2003 | Williams et al. | |
| 6,744,877 B1* | 6/2004 | Edwards | 379/265.02 |
| 6,819,759 B1* | 11/2004 | Khuc et al. | 379/309 |
| 6,901,266 B2* | 5/2005 | Henderson | 455/462 |
| 7,051,106 B2* | 5/2006 | Grobler et al. | 709/228 |
| 7,076,048 B2* | 7/2006 | Lee et al. | 379/265.01 |
| 7,215,663 B1* | 5/2007 | Radulovic | 370/356 |
| 7,386,850 B2* | 6/2008 | Mullen | 718/104 |
| 7,536,002 B1* | 5/2009 | Ma et al. | 379/266.02 |

OTHER PUBLICATIONS

Office Action dated Jun. 19, 2002 in connection with U.S. Appl. No. 09/735,500.

Office Action dated Sep. 16, 2002 in connection with U.S. Appl. No. 09/735,500.

Office Action dated May 21, 2003 in connection with U.S. Appl. No. 09/735,500.

Office Action dated Jan. 16, 2004 in connection with U.S. Appl. No. 09/735,500.

* cited by examiner

APPLICATION BASED QUEUING VIA AN H.323/SIP INTERFACE

This application is a continuation of prior application Ser. No. 09/735,500 filed on Dec. 14, 2000 now U.S. Pat. No. 6,763,093, and which is incorporated herein by reference.

FIELD OF INVENTION

The present invention relates, in general, to telephony services, and relates specifically to the queuing of calls in a telephony environment in which services are provisioned.

BACKGROUND OF THE INVENTION

A typical office setting, such as an office employing 50 people, will not require 50 separate channels in order to provide adequate access to a telephony service such as voicemail. Most of the time, it would suffice to provide around 6 to 8 channels for these 50 people to be able to use the voicemail service. This is sufficient because not every employee will be attempting to access their voicemail at the same time. Such systems are engineered in order that the system is small as possible, while an adequate grade of service is made available to its users.

One manner in which such a traditional system can be engineered to make more efficient use of its resources is by the use of queuing. In a six-channel system that does not employ queuing, on the assumption that 6 users are concurrently using the voicemail system, and a seventh user is attempting to access the system, the seventh user would simply receive a busy signal during such attempts, until one of the previous users disconnects from the service. If queuing is employed, the seventh employee would not receive a busy signal, but would hear a standard ring-back tone. During that time, the call would be placed in a queue and would wait there until one of the 6 channels, or ports, becomes available.

FIG. 1 shows the interaction, in such a prior art system, between switch means 102 employing queuing and application means 104 providing a service, such as voice messaging. In such a system, queue 106 is maintained on the switch means 102. The switch means 102 must have detailed knowledge of the number of ports and their current busy/idle status in order to manage calls in the queue 106. Calls in the queue 106 are presented to the application means 104 only when a port becomes idle, i.e. available.

In a prior art system such as in FIG. 1, many steps are involved in the placement of a call. Firstly, a setup command is sent. In a situation where the application system may provide a plurality of services (eg. Voice Messaging or Automated Attendant), the setup message would identify which service the caller is trying to access. When such a setup command is received by the system, a determination is made as to what resources are needed in order to answer a call. If the necessary resources are available, then the call is answered; if the resources are not available, the switch parks the call until the resources become available. For example, a new call requesting speech-recognition may be queued if only four of the ports on the application system can provide the speech-recognition feature and those four ports are already in use.

However, the fact remains that queuing functionality is not available if it is not implemented on the switch itself. Therefore, the use of switches which do not implement queuing is not possible in networks that require this functionality.

Some prior art systems attempt to provide other types of queuing to non-switch means on systems which are very different technically from voice messaging. For instance, an authentication machine might accept userid and password combinations to provide access to a given domain. In this case, simultaneous access attempts are effectively queued by another means before they are processed. These requests are queued in a manner that is transparent to the authentication machine. However, such systems are very limited in nature and are not easily adaptable to either voice calls or to the provisioning of messaging services. Furthermore, such systems are not designed to accommodate the various particularities associated with having a live person making the call, and not just another machine. An example of such a particularity would be the necessity to provide an audible ring-back tone over the communication channel in the absence of available resources for the call type being requested.

Recently, there have been developments in the provisioning of telephony services over networks employing the Internet Protocol (IP), rather than over a public-switched telephone network (PSTN), in conjunction with a private branch exchange (PBX). Some of these IP-based PBXs do not yet have queuing capabilities. Moreover, the amount of information that must be provided in the call setup command will continue to increase as the number and sophistication of the provided services increases. With the increased functionality and bandwidth being provided by voice-over-IP systems, keeping track of this information at the switch itself will become burdensome and will restrict the performance of the switch.

A particular standard outlining the use of IP-based telephony services is the H.323 standard recommendation entitled "Packet-based multimedia communications systems". This recommendation was published by the Telecommunication Standardization Section of the International Telecommunication Union (ITU-T) in February of 1998. An H.323 interface inherently provides for a route point intermediate state in which a call may be left indefinitely until resources become available. H.323 employs logical ports as opposed to physical ports in the setup of calls in such packet-based systems. The use of such logical ports could facilitate the provisioning of queuing as-part of an application-based solution, as opposed to relying on traditional switch queuing solutions. An alternative IP based standard is Session Initiation Protocol published as RFC 2543 by the Internet Engineering Task Force in March of 1999. It has a similar call model (where the setup phase is renamed invite) and logical ports.

SUMMARY OF INVENTION

Accordingly, it is an object of the invention to provide queuing functionality in a telephony system which employs a switch that cannot itself implement a queuing mechanism. It is a further object of the invention to reduce the amount of information required in standard on-switch queuing systems with respect to the type of call requested as well as the status of the individual ports of the switch.

According to one aspect of the invention, there is provided a telephony accessed application system for providing a service in accordance with a switching interface to a plurality of end units connected to a network, said application system comprising: switch means for switching calls over the network from said plurality of end units to said messaging system; application means for providing the messaging service to said plurality of end units on the network; and queue means provided within said application means for queuing calls which are in excess of the capacity of said application means.

According to another aspect of the invention, there is provided an application means for use in a telephony-accessed application system for providing a service in accordance with a switching interface to a plurality of end units connected to a network, said application system comprising switch means for switching calls over the network from said plurality of end units to said messaging system, said application means for providing the messaging service to said plurality of end units on the network comprising: queue means for queuing calls which are in excess of the capacity of said application means.

According to a further aspect of the invention, there is provided a method of providing a service in a telephony-accessed application system in accordance with a switching interface to a plurality of end units connected to a network, said application system comprising: switch means for switching calls over the network from said plurality of end units to said application system; application means for providing the service to said plurality of end units on the network; queue means provided within said application means for queuing calls which are in excess of the capacity of said application means; said method comprising the steps of: sending a setup message from the switch means to the application means to verify whether appropriate resources are available in order to answer a call; determining, at the application means, whether the appropriate resources are available; proceeding to a connect state if said determining step indicates that the appropriate resources are available; and placing the call in an alert state and placing the call in said queue means until the appropriate resources become available if said determining step indicates that the appropriate resources are not available.

In accordance with the present invention, since the switch itself does not perform the queuing functions, the responsibility of processing large amounts of data relating to the exact status of each port is transferred from the switch itself to the application means.

BRIEF DESCRIPTION OF THE DRAWINGS

Embodiments of the present invention will be further described with reference to the accompanying drawings in which.

DETAILED DESCRIPTION OF THE INVENTION

Figure 1:
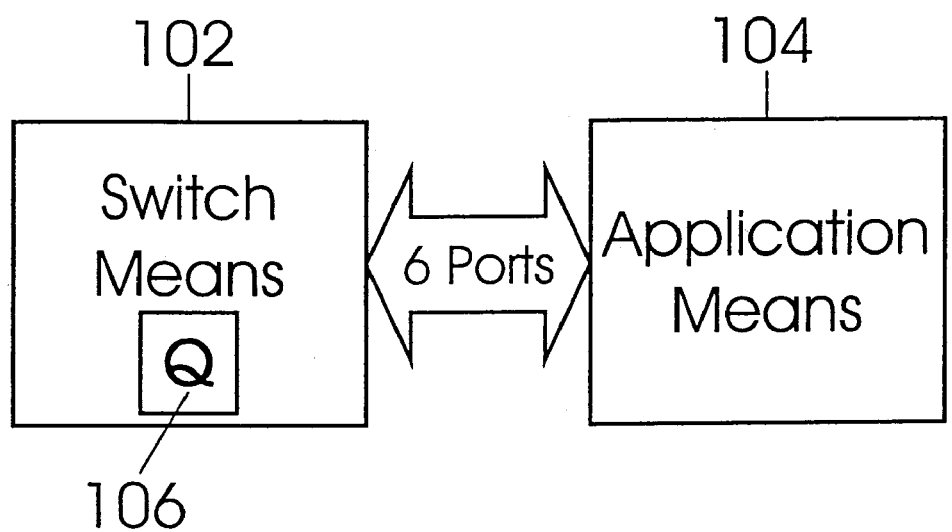
FIG. 1 illustrates diagrammatically a prior art telephony service system.
Figure 2A:
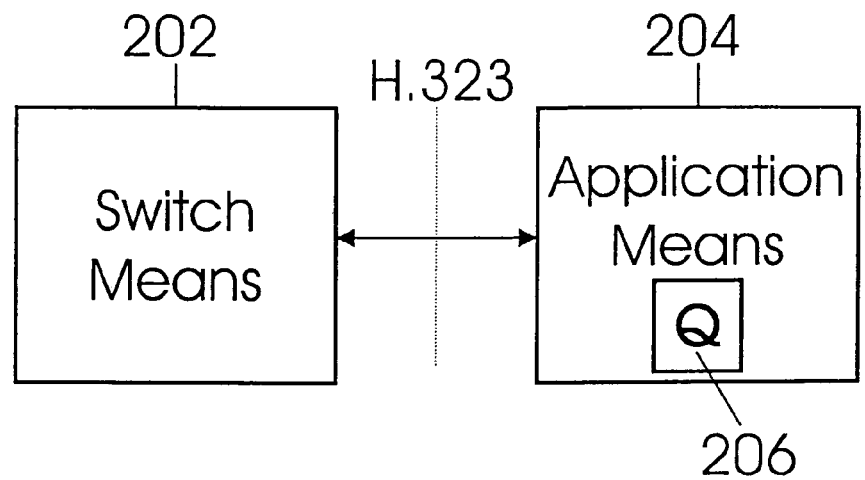
FIG. 2A illustrates a telephony-accessed application system according to an embodiment of the present invention.

A telephony-accessed application system according to the present invention is illustrated in FIG. 2A. In contrast to the prior art system of FIG. 1, the system of FIG. 2A maintains queue 206 within application means 204 and not on switch means 202 itself. This is made possible since the H.323 interface is used, as is shown visually in FIG. 2A. Because H.323 employs logical ports and not physical ports, a call is not sitting on the port physically while it is in the queue 206. As such, there is no requirement to collect information at the time of setting up the call relating to the type of service being requested. The switch means 202 only knows the application service directory number (DN). It is now also unnecessary for the switch means 202 itself to keep track of the number of ports and their current busy/idle status since the queue 206 is now provided within the application means. Although the H.323 interface is preferred in this embodiment of the present invention, it is equally as possible for the present invention to use any other switch interface which has a call-state model having three stages: namely connect (offering) stage, alerting stage, and connect stage. An example of another switch interface having this call-state model is the Session Initiation Protocol. These stages are described in further detail in FIG. 2B with specific reference to the model used in the H.323 interface.

Figure 2B:
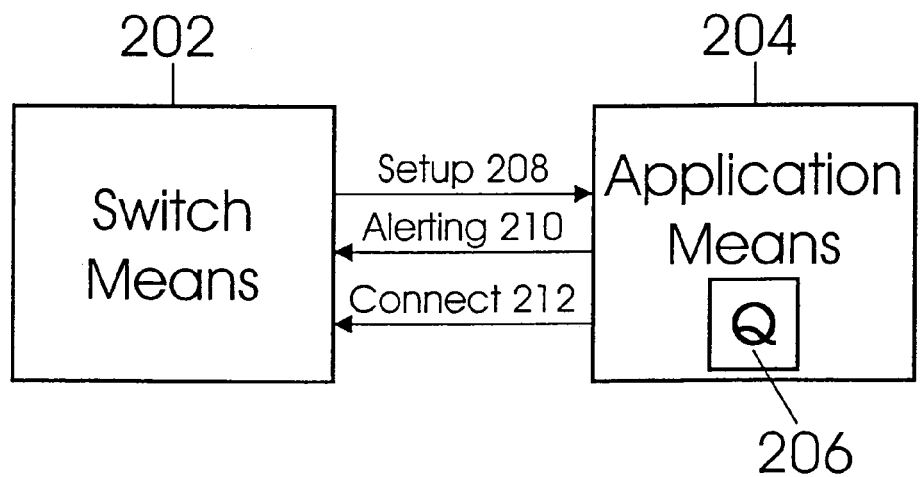
FIG. 2B illustrates steps in the connection of a call for the system of FIG. 2A.

FIG. 2B shows the basic steps used in connecting a call in a system according to FIG. 2A. Although not shown in FIG. 2B, it is to be understood that callers will use end units, such as telephones, to connect to a network, such as a network employing the Internet Protocol, in order to make full use of a system according to the figure. Alternative end units may be soft implementations of telephones such as Nortel Networks' i2050 system. Switch means 202 begins establishment of a call by sending a setup message 208 to the application means 204. At this point, the application means 204 verifies whether it has the resources to answer the call. If such resources are available, the call will proceed directly to connect state 212. If such resources are not available, the application means 204 will place the call in alerting state 210 and place the call in the queue 206. In the case of multiple calls being held in the queue 206, the application means 204 monitors call hierarchy and keeps track of the "age" of the call in question: that is, how long the call has been waiting in the queue 206. When the necessary resources do become available, the application means 204 will place the "oldest" call in the connect state 212. Subsequent calls will be dealt with chronologically from the "oldest" to "youngest".

However, when multiple callers are waiting in the queue 206 (i.e. are in alert state), consideration is given to the type and level of service that is being requested. Consequently, the system will sometimes allow a request to proceed to the front of the queue in the case where this request requires less resources than existing requests in the queue 206. For instance, consider the earlier CallPilot example wherein the system is now provided with the queue 206 on the application means 204 as opposed to on the switch means 202. Suppose there are multiple callers who are in an alert state 210, waiting for the availability of a port that can handle a speech-recognition-enabled call. If a new caller calls in to the system and makes a request for a standard DTMF-based call, the system may allow that new caller to proceed to the connect state since the necessary resources, which are a lower requirement than the other calls in the queue, are available for the new caller=s request. This completion of the new caller's call will not be hampered by the multiple callers who are waiting in the queue. In contrast, if a further caller were to make a call to the system and request a speech-recognition-enabled call, that further caller would be placed in the queue after all of the multiple callers who are awaiting the availability of similar resources.

Therefore, it is evident that the present invention offers many advantages over prior art systems. In accordance with the present invention, it is possible to use queuing on a switch that was not designed for queuing, since the queuing is achieved at the application means. Consequently, the switch itself is relieved of the burden of having to keep track of the exact status of each of its ports at all times. The high-level queuing is performed at a logical level rather than at the physical level, and therefore affords a cleaner interface. Furthermore, the implementation of the queuing functions in the terminating application means allows for the use of a wider variety of intermediate switch means in a network.

What is claimed is:

1. A telephony-accessed application system for use in an IP-based telephony system and operable for providing an automated service to a plurality of end units connected to a network, the telephony-accessed application system comprising:

means for receiving a plurality of calls from a switch via a switch interface having a call-state model having at least three stages, including an offering stage, an alerting stage and a connect stage; and a queue for queuing calls which are in excess of call processing resources of the telephony-accessed application system.

2. A telephony-accessed application system in accordance with claim 1 wherein the automated service is a messaging service.

3. A telephony-accessed application system in accordance with claim 2 wherein the messaging service is a voice messaging service.

4. A telephony-accessed application system in accordance with claim 1 wherein the switch interface is defined by the H.323 standard.

5. A telephony-accessed application system in accordance with claim 1 wherein the switch interface is defined by the Session Initiation Protocol standard.

6. A telephony-accessed application system in accordance with claim 1 wherein the network is a network employing an Internet Protocol.

7. A telephony-accessed application system in accordance with claim 1 wherein a call for which call processing resources become available is allowed to move in the queue ahead of a call for which call processing resources are not available.

8. A method for use in an IP-based telephony system and operable for providing an automated service to a plurality of end units connected to a network, the method comprising:

receiving, at an application operable for providing the automated service, a setup message associated with a call from a switch;

determining whether the application has appropriate resources to handle the call;

proceeding to a connect state if the application has the appropriate resources available;

placing the call in an alerting stage and placing the call in a queue if the application does not have the appropriate resources available; and maintaining the call in the queue until the appropriate resources become available.

9. A method in accordance with claim 8 wherein the maintaining the call in the queue further comprises:

monitoring the age of a plurality of calls in the queue; and proceeding to connect the oldest call among the plurality of calls in the queue for which resources become available.

10. A method in accordance with claim 8 wherein the automated service provides a messaging service.

11. A method in accordance with claim 10 wherein the messaging service is a voice messaging service.

12. A method in accordance with claim 8 wherein the setup message is defined by the H.323 standard.

13. A method in accordance with claim 8 wherein the setup message is defined by the Session Initiation Protocol standard.

14. A method in accordance with claim 8 wherein a call in the queue for which call processing resources become available is allowed to move ahead of a call in the queue for which call processing resources are not available.

15. A method for use in an IP-based telephony system and operable for providing one or more automated services to a plurality of end units connected to a network, the method comprising:

receiving from a switch, at an application operable for providing the automated services, a setup message associated with a call from one of the plurality of end units, the call defined by a call-state model having an offering stage, an alerting stage, and a connect stage;

determining whether the application has appropriate resources to handle the call;

proceeding to a connect state if the application has the appropriate resources available;

placing the call in an alerting stage and placing the call in a queue if the application does not have the appropriate resources available; and maintaining the queued call in the queue until the appropriate resources become available; and when the appropriate resources become available, placing the queued call into a connect state.

16. A method in accordance with claim 15 further comprising:

allowing a queued call for which call processing resources become available to move in the queue ahead of a queued call for which call processing resources are not available.

17. A method in accordance with claim 15 wherein the call is in accordance with the H.323 standard.

18. A method in accordance with claim 15 wherein the call is in accordance with the Session Initiation Protocol standard.

* * * * *

UNITED STATES PATENT AND TRADEMARK OFFICE
CERTIFICATE OF CORRECTION

| | | |
|---|---|---|
| PATENT NO. | : 7,613,289 B2 | Page 1 of 1 |
| APPLICATION NO. | : 10/856733 | |
| DATED | : November 3, 2009 | |
| INVENTOR(S) | : John E. Lumsden | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1460 days.

Signed and Sealed this

Nineteenth Day of October, 2010

David J. Kappos
*Director of the United States Patent and Trademark Office*